US012048073B2

(12) United States Patent
Ichikawa et al.

(10) Patent No.: US 12,048,073 B2
(45) Date of Patent: Jul. 23, 2024

(54) LIGHTING CIRCUIT

(71) Applicant: KOITO MANUFACTURING CO., LTD., Tokyo (JP)

(72) Inventors: Tomoyuki Ichikawa, Shizuoka (JP); Toru Ito, Shizuoka (JP); Atsushi Ozawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 58 days.

(21) Appl. No.: 17/867,870

(22) Filed: Jul. 19, 2022

(65) Prior Publication Data

US 2022/0353966 A1 Nov. 3, 2022

Related U.S. Application Data

(63) Continuation of application No. PCT/JP2021/000853, filed on Jan. 13, 2021.

(30) Foreign Application Priority Data

Jan. 20, 2020 (JP) ................................ 2020-006923

(51) Int. Cl.
*H05B 45/18* (2020.01)
*H05B 45/345* (2020.01)

(52) U.S. Cl.
CPC ........... *H05B 45/18* (2020.01); *H05B 45/345* (2020.01)

(58) Field of Classification Search
CPC ........ H05B 45/18; H05B 45/28; H05B 45/30; H05B 45/47; H05B 45/56; H05B 45/345; H05B 45/395
See application file for complete search history.

(56) References Cited

U.S. PATENT DOCUMENTS

| | | | | |
|---|---|---|---|---|
| 9,854,635 | B2 * | 12/2017 | Liu ........................ | H05B 45/18 |
| 2012/0056545 | A1 * | 3/2012 | Radermacher ......... | H05B 45/20<br>250/238 |

(Continued)

FOREIGN PATENT DOCUMENTS

| | | | |
|---|---|---|---|
| EP | 2355621 | A2 | 8/2011 |
| JP | 2019169655 | A | 10/2019 |

(Continued)

OTHER PUBLICATIONS

International Preliminary Report on Patentability (PCT/IPEA/409) with translation issued in corresponding International Patent Application No. PCT/JP2021/000853 dated Jul. 26, 2022. (8 pages).

(Continued)

*Primary Examiner* — Tung X Le
(74) *Attorney, Agent, or Firm* — BUCHANAN INGERSOLL & ROONEY PC

(57) ABSTRACT

An automotive lamp includes a temperature-sensing element having an electrical state that changes according to the temperature T of a semiconductor light source, and a constant current driver that generates a driving current $I_{LED}$ that corresponds to the temperature T. The maximum value of the temperature differential of the driving current $I_{LED}$ in a first temperature range from a reference temperature $T_0$ to a first temperature $T_1$ ($T_1>T_0$) is smaller than the maximum value of the temperature differential of the driving current $I_{LED}$ in a second temperature range from the first temperature $T_1$ to a second temperature $T_2$ ($T_2>T_1$).

7 Claims, 11 Drawing Sheets

(56) References Cited

U.S. PATENT DOCUMENTS

| | | | | |
|---|---|---|---|---|
| 2014/0361711 | A1* | 12/2014 | Takahashi | H05B 45/395 315/294 |
| 2015/0069908 | A1* | 3/2015 | Fukui | H05B 45/48 315/193 |
| 2016/0338165 | A1* | 11/2016 | Zhai | H05B 45/18 |
| 2019/0394850 | A1* | 12/2019 | Delgrange | H05B 45/56 |
| 2020/0359473 | A1* | 11/2020 | Guth | H05B 45/37 |

FOREIGN PATENT DOCUMENTS

| | | | |
|---|---|---|---|
| WO | 2015059675 | A1 | 4/2015 |
| WO | 2016158423 | A1 | 10/2016 |
| WO | 2020013032 | A1 | 1/2020 |

OTHER PUBLICATIONS

International Search Report (PCT/ISA/210) with translation dated Mar. 23, 2021, by the Japan Patent Office as the International Searching Authority for International Application No. PCT/JP2021/000853. (4 pages).

Extended European Search Report dated May 8, 2023, issued in corresponding European Application No. 21744518.8. (10 pages).

Office Action (Notification of Reason(s) for Refusal) issued on Feb. 20, 2024, in corresponding Japanese Patent Application No. 2021-573089 and machine English translation of the Office Action. (4 pages).

* cited by examiner

LIGHTING CIRCUIT

BACKGROUND

1. Technical Field

The present disclosure relates to a lamp to be used for an automobile or the like.

2. Description of the Related Art

As conventional light sources for automotive lamps, in many cases, electric bulbs have been employed. In recent years, semiconductor light sources such as light-emitting diodes (LEDs) or the like are coming to be widely employed. The luminance of an LED can be controlled according to a driving current that flows through the LED. Accordingly, conventional techniques employ constant current control in which the driving current is stabilized to a target amount that corresponds to the target luminance by means of a constant current series regulator or a constant current output step-down switching converter.

For automotive lamps, there are regulations determined with respect to luminous flux. For example, the United Nations (UN) standard requires a replaceable standardized LED light source LR5 for an automotive signal lamp to emit a luminous flux with a luminance of 102 to 138 lm in its stable state. Furthermore, the ratio of the luminous flux after 30 minutes from when the LED light source is turned on to the luminous flux after one minute from when the LED light source is turned on (lumen maintenance rate) is required to be 80% or higher.

The light amount (luminous flux) of a semiconductor light source has temperature dependence. FIG. 1 is a diagram showing an example of the relation between the temperature of the LED and the luminous flux thereof. When the same driving current is supplied to the semiconductor light source, as the temperature becomes higher, the luminance of the semiconductor light source becomes smaller.

FIG. 2 is a diagram showing the operation of an automotive lamp that controls a semiconductor light source using a constant current control method. At the time point to, the automotive lamp starts to turn on. The driving current $I_{LED}$ that flows through the semiconductor light source is stabilized to a predetermined amount of current. The current continuously flows through the semiconductor light source, leading to an increase of the temperature T of the semiconductor light source. Eventually, the current is stabilized at a balanced point between heat generation and heat dissipation. In a state in which the semiconductor light source has a low temperature immediately after it is turned on, the semiconductor light source emits light with high luminance. However, as the temperature of the semiconductor light source becomes higher with the passage of time, the luminance thereof becomes smaller.

The UN standard requires the lumen maintenance rate to be 80% or more in a stable period after the time point $t_1$. In a case of employing the semiconductor light source shown in FIG. 1, assuming that the device temperature becomes 55° C. at the time point $t_1$, and the steady device temperature is 80° C. in the stable period, the light source luminous flux is approximately 80% at the time point $t_1$, and is approximately 60% in the stable period. Accordingly, with such an arrangement, the lumen maintenance rate is 60/80×100=(%)=75%. That is to say, it is difficult to satisfy the standard.

SUMMARY

The present disclosure has been made in order to solve such a problem.

An embodiment of the present disclosure relates to a lighting circuit. The lighting circuit includes: a temperature-sensing element having an electrical state that changes according to a temperature T of a semiconductor light source; and a constant current driver structured to generate a driving current that corresponds to the temperature T. The maximum value of the temperature differential of the driving current in a first temperature range from a reference temperature $T_0$ to a first temperature $T_1$ ($T_1>T_0$) is smaller than the maximum value of the temperature differential of the driving current in a second temperature range from the first temperature $T_1$ to a second temperature $T_2$ ($T_2>T_1$).

Another embodiment of the present disclosure relates to an automotive lamp. The automotive lamp includes: a semiconductor light source; and a lighting circuit structured to supply a driving current to the semiconductor light source. An amount of change of the driving current in a start period immediately after turning on is smaller than an amount of increase of the driving current in a stable period that is subsequent to the start period.

It should be noted that any combination of the components described above or any component or any manifestation of the present disclosure may be mutually substituted between a method, apparatus, system, and so forth, which are also effective as an embodiment of the present disclosure.

DETAILED DESCRIPTION OF THE INVENTION OUTLINE OF EMBODIMENTS

Figure 1:
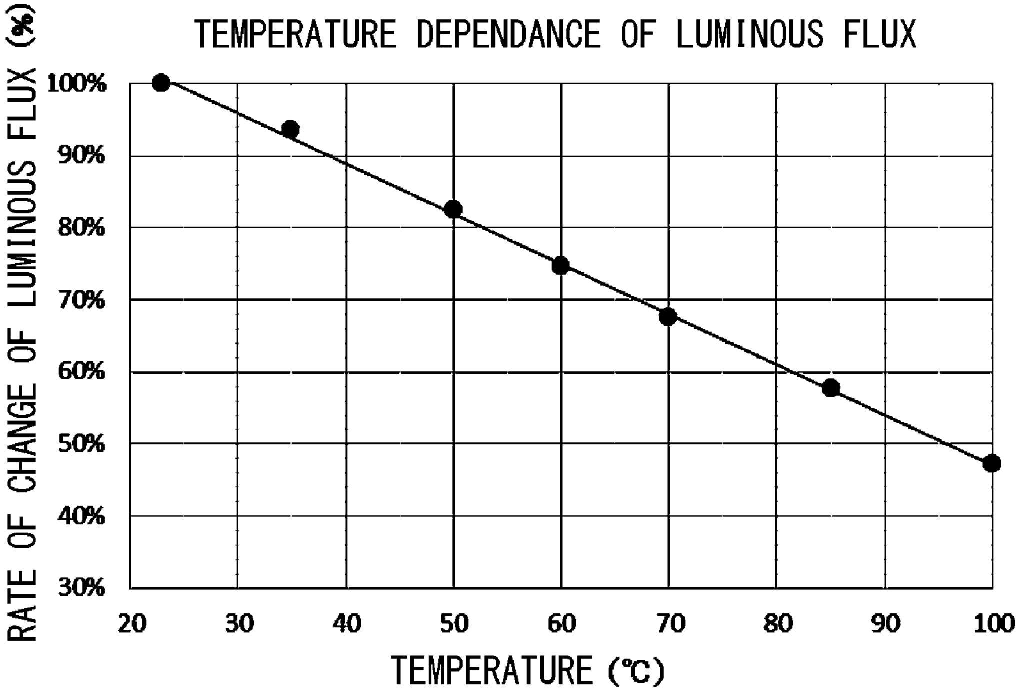
FIG. 1 is a diagram showing an example of the relation between the temperature of an LED and the luminous flux.

Description will be made regarding an outline of several example embodiments of the present disclosure. In this outline, some concepts of one or more embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments, and is by no means intended to restrict essential elements of the embodiments. In some cases, for convenience, the term "one embodiment" may be used herein to refer to a single embodiment (example or modification) or multiple embodiments (examples or modifications) disclosed in the present specification.

One embodiment disclosed in the present specification relates to a lighting circuit. The lighting circuit includes: a temperature-sensing element having an electrical state that changes according to a temperature T of a semiconductor light source; and a constant current driver structured to generate a driving current that corresponds to the temperature T. The maximum value of the temperature differential of the driving current in a first temperature range from a reference temperature $T_0$ to a first temperature $T_1$ ($T_1>T_0$) is smaller than the maximum value of the temperature differential of the driving current in a second temperature range from the first temperature $T_1$ to a second temperature $T_2$ ($T_2>T_1$).

In one embodiment, the temperature of the semiconductor light source rises to the first temperature from the reference temperature in a start period (several dozen seconds to several minutes) immediately after turning on. In the subsequent stable period, the temperature of the semiconductor light source rises from the first temperature to the second temperature. With such an arrangement in which the correction amount to be applied to the driving current is suppressed in the start period so as to reduce the luminous flux at the start time point of the stable period, this allows the luminous flux to have improved stability in the stable period.

In one embodiment, the first temperature $T_1$ may be determined based on a temperature at a start time point of a stable period. Also, the second temperature $T_2$ may be determined based on a steady temperature in the stable period. For example, the start point may be one minute after the start of turning on. The second temperature may be determined based on the temperature 30 minutes after the start of turning on.

In one embodiment, both the temperature differential of the driving current in the first temperature range and the temperature differential of the driving current in the second temperature range may be a positive value.

In one embodiment, the temperature differential of the driving current in the first temperature range may be a negative value, and the temperature differential of the driving current in the second temperature range may be a positive value.

In one embodiment, in a third range that is higher than a third temperature $T_3$ ($T_3>T_2$), the driving current may decrease. This allows temperature derating to be provided.

In one embodiment, the constant current driver may include: a current source having a current-setting terminal, and structured to generate the driving current that is inversely proportional to an impedance of a circuit coupled to the current-setting terminal; a first resistor and a second resistor arranged in series between the current-setting terminal and the ground; and a Negative Temperature Coefficient (NTC) thermistor arranged in parallel with the second resistor.

An automotive lamp according to one embodiment includes: a semiconductor light source; and a lighting circuit configured to supply a driving current to the semiconductor light source. The amount of change of the driving current in a period from the start of the semiconductor light source turning on to a time point after one minute elapses is smaller than an amount of increase of the driving current in a period from one minute after the start of the semiconductor light source turning on to a time point after 30 minutes elapses.

Embodiments

Description will be made below regarding preferred embodiments with reference to the drawings. In each drawing, the same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Figure 3:
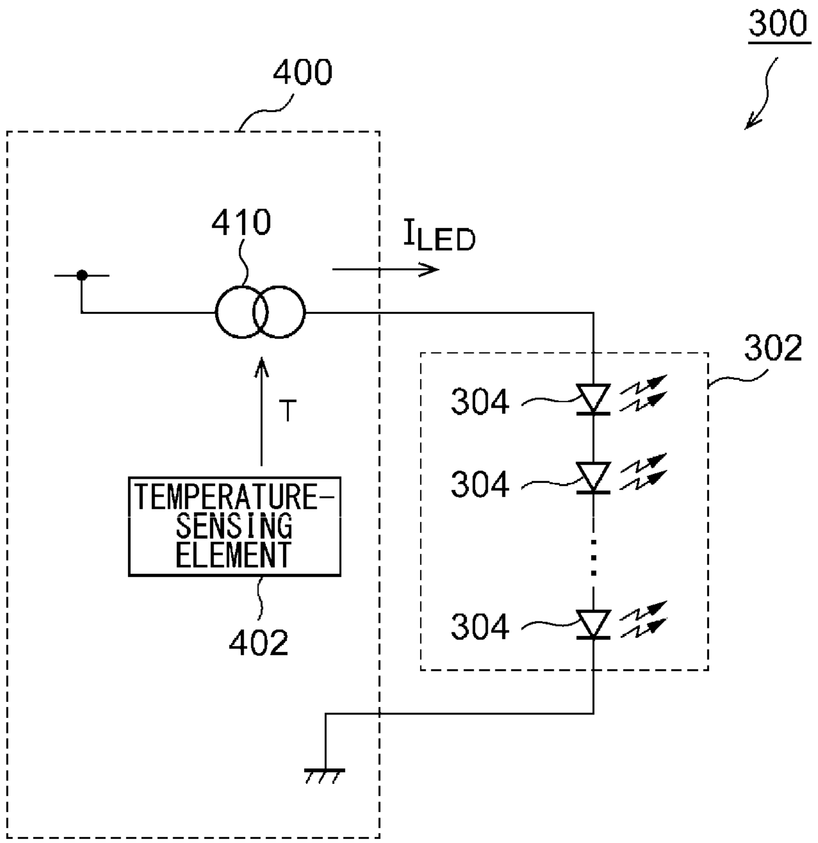
FIG. 3 is a block diagram showing an automotive lamp provided with a lighting circuit according to an embodiment.

FIG. 3 is a block diagram showing an automotive lamp 300 including a lighting circuit 400 according to an embodiment. The automotive lamp 300 includes a semiconductor light source 302 and the lighting circuit 400. The semiconductor light source 302 includes one or multiple light-emitting elements 304 coupled in series and/or in parallel. As such a light-emitting element 304, an LED is suitably employed. However, the present invention is not restricted to such an arrangement. The automotive lamp 300 is configured as a stop lamp or a tail lamp, for example. The semiconductor light source 302 may be configured as a red LED. The automotive lamp 300 according to an embodiment is configured as an LED socket in which the semiconductor light source 302 and the lighting circuit 400 are housed in a single package. Such an LED socket has a structure that allows it to be detachably mounted on an unshown lamp body.

The lighting circuit 400 mainly includes a temperature-sensing element 402 and a constant current driver 410. The temperature-sensing element 402 is provided in order to detect the temperature T of the semiconductor light source 302. The electrical state of the temperature-sensing element 402 changes according to the temperature T of the semiconductor light source 302. Examples of the electrical state of the temperature-sensing element include the impedance of the temperature-sensing element, a voltage drop thereof, current flowing through the temperature-sensing element, voltage at one end of the temperature-sensing element, etc. A temperature-sensing element 622 is capable of directly or indirectly monitoring the temperature of the semiconductor light source 302. For example, the temperature-sensing element 622 may be directly mounted on the semiconductor light source 302. Also, the temperature-sensing element 622 may be mounted on the same substrate such that it is adjacent to or in the vicinity of the semiconductor light source 302. Alternatively, the temperature-sensing element 622 may be mounted on a heatsink on which the semiconductor light source 302 is mounted.

The constant current driver 410 generates a driving current $I_{LED}$ that corresponds to the temperature T detected by the temperature-sensing element 402. FIG. 3 shows an arrangement in which the constant current driver 410 functions as a source (discharger) of the driving current $I_{LED}$. However, the present invention is not restricted to such an arrangement. Also, the constant current driver 410 may be configured to sink the driving current $I_{LED}$.

Figure 4:
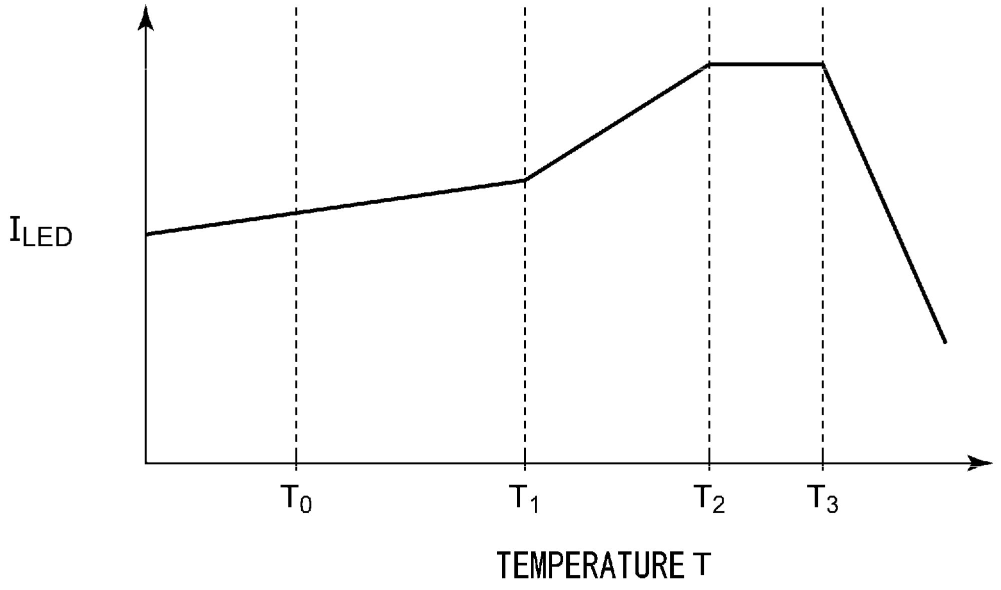
FIG. 4 is a diagram showing an example of the temperature characteristics of the driving current $I_{LED}$ generated by a constant current driver.

FIG. 4 is a diagram showing an example of the temperature characteristics of the driving current $I_{LED}$ generated by the constant current driver 410. A reference temperature $T_0$, first temperature $T_1$ ($T_1>T_0$), and second temperature $T_2$ ($T_2>T_1$) are defined. The temperature range from the reference temperature $T_0$ to the first temperature $T_1$ ($T_1>T_0$) will be referred to as a first temperature range $T_0$ to $T_1$. The temperature range from the first temperature $T_1$ to the second temperature $T_2$ ($T_2>T_1$) will be referred to as a second temperature range $T_1$ to $T_2$.

The reference temperature $T_0$ is the temperature at the start of turning on. Typically, the temperature $T_0$ is room temperature (25 to 30° C.). The first temperature $T_1$ is the temperature at the start of the stable period. The second temperature $T_2$ is the steady temperature in the stable period after a sufficient period of time elapses.

The maximum value of the temperature differential of the driving current $I_{LED}$, i.e., $dI_{LED}/dT$, in the first temperature range $T_0$ to $T_1$ is smaller than the maximum value of the temperature differential of the driving current $I_{LED}$, i.e., $dI_{LED}/dT$, in the second temperature range $T_1$ to $T_2$.

Furthermore, a temperature $T_3$ that is higher than the temperature $T_2$ is defined. When the device temperature exceeds the third temperature $T_3$, the driving current $I_{LED}$ decreases. This is so-called temperature derating. The third temperature $T_3$ is defined to be equal to or higher than 90° C., and is defined as 105° C., for example.

The above is the configuration of the automotive lamp 300. The features and advantages of the automotive lamp 300 can be clearly understood based on a comparison with a comparison technique. Accordingly, before the explanation of the operation of the automotive lamp 300, description will be made regarding such a conventional technique.

Conventional Technique

Figure 5:
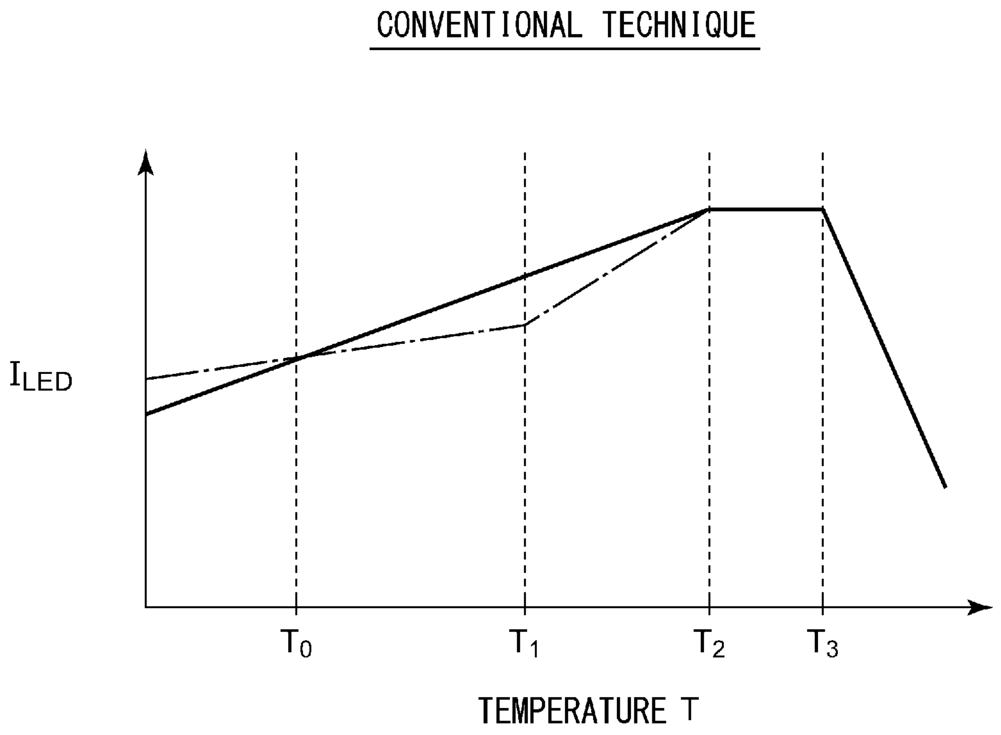
FIG. 5 is a diagram showing the temperature characteristics of the driving current $I_{LED}$ according to a comparison technique.

FIG. 5 is a diagram showing the temperature characteristics of the driving current $I_{LED}$ in a comparison technique. The driving current $I_{LED}$ increases at a constant slope according to an increase of the temperature. Here, $T_1$ and $T_2$ correspond to the first temperature $T_1$ and the second temperature $T_2$ shown in FIG. 4, respectively. That is to say, the temperature differential $dI_{LED}/dT$, i.e., the slope, of the driving current $I_{LED}$ in the first temperature range from $T_0$ to $T_1$ is substantially the same as the temperature differential, i.e., the slope, of the driving current $I_{LED}$ in the second temperature range from $T_1$ to $T_2$. For comparison, the temperature characteristics shown in FIG. 4 are indicated by the line of alternately long and short dashes.

In other words, in the embodiment, a correction rate of the driving current $I_{LED}$ is smaller in the first temperature range from $T_0$ to $T_1$ as compared with the comparison result. In contrast, the correction rate of the driving current is larger in the second temperature range from $T_1$ to $T_2$.

Figure 2:
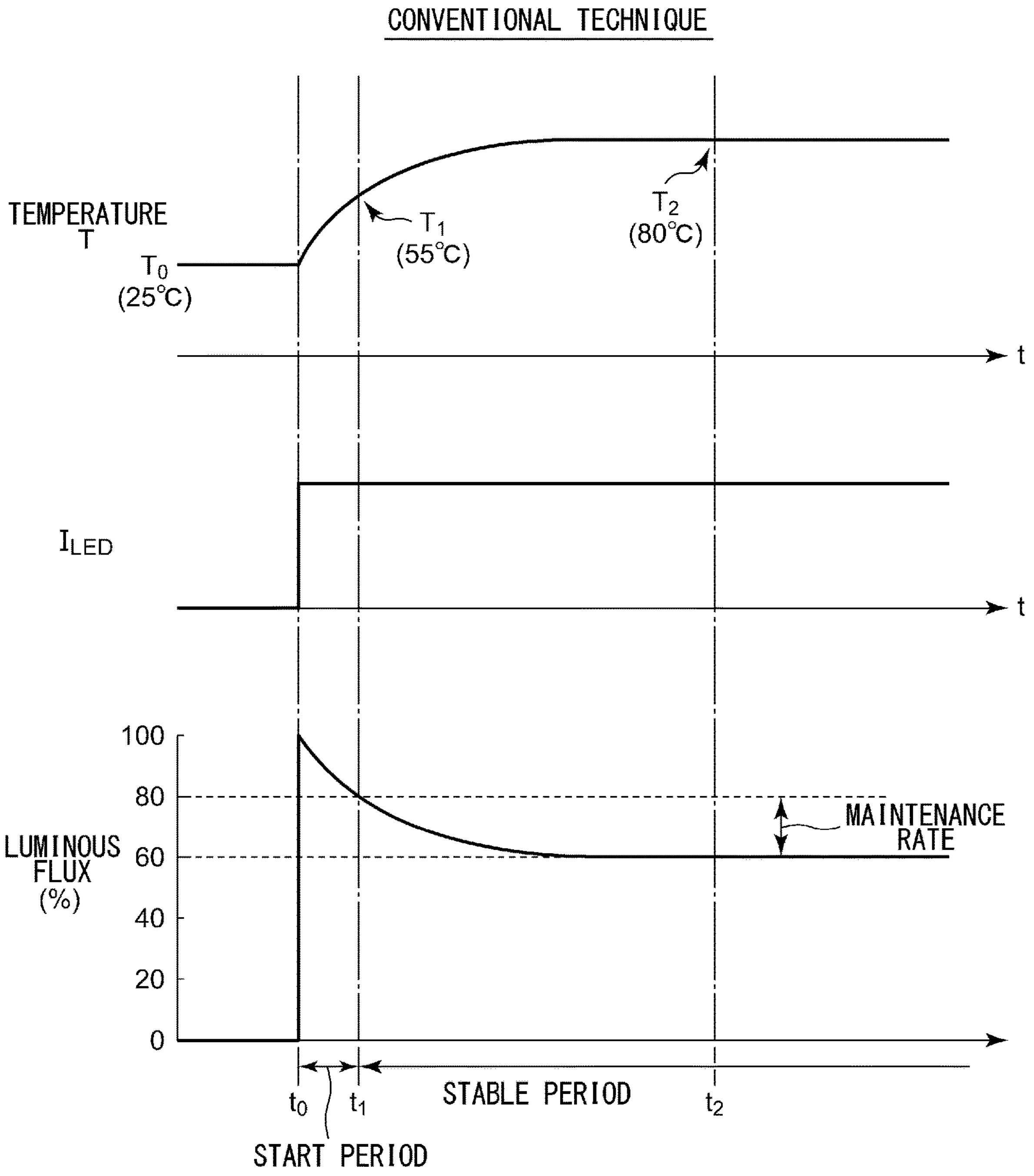
FIG. 2 is a diagram showing the operation of an automotive lamp configured to control a semiconductor light source using a constant current control method.
Figure 6:
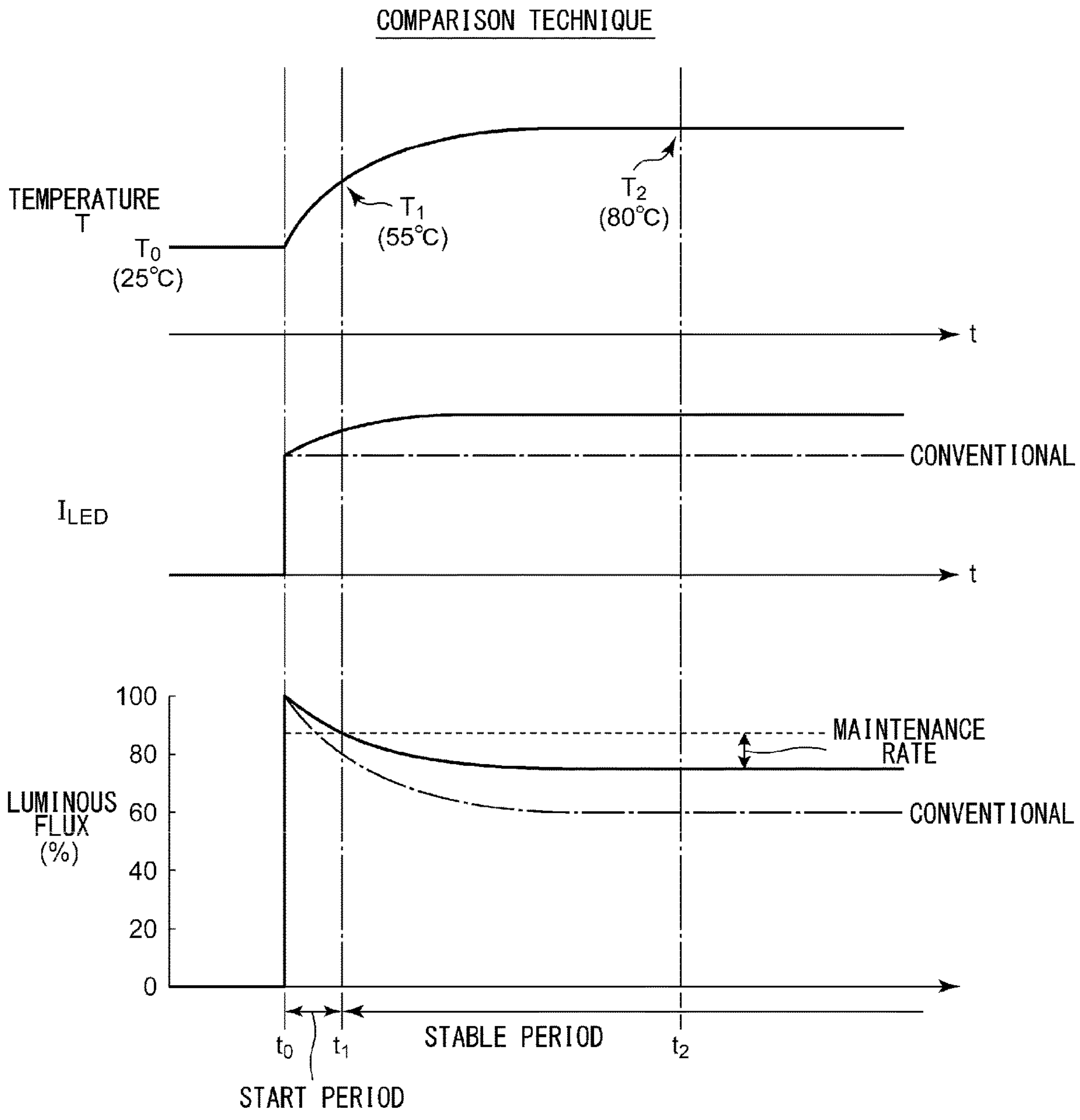
FIG. 6 is an operation waveform diagram of an automotive lamp according to a comparison technique.

FIG. 6 is an operation waveform diagram of an automotive lamp according to a comparison technique. For comparison, the waveform of the comparison technique is indicated by the line of alternately long and short dashes. Description will be made assuming that the temperature T of the semiconductor light source transits in the same manner as shown in FIG. 2. With the comparison technique, the driving current $I_{LED}$ increases according to an increase of the temperature with the passage of time. As a result, this relaxes the decay of the luminous flux after the time point to as compared with the comparison technique.

Embodiment

Figure 7:
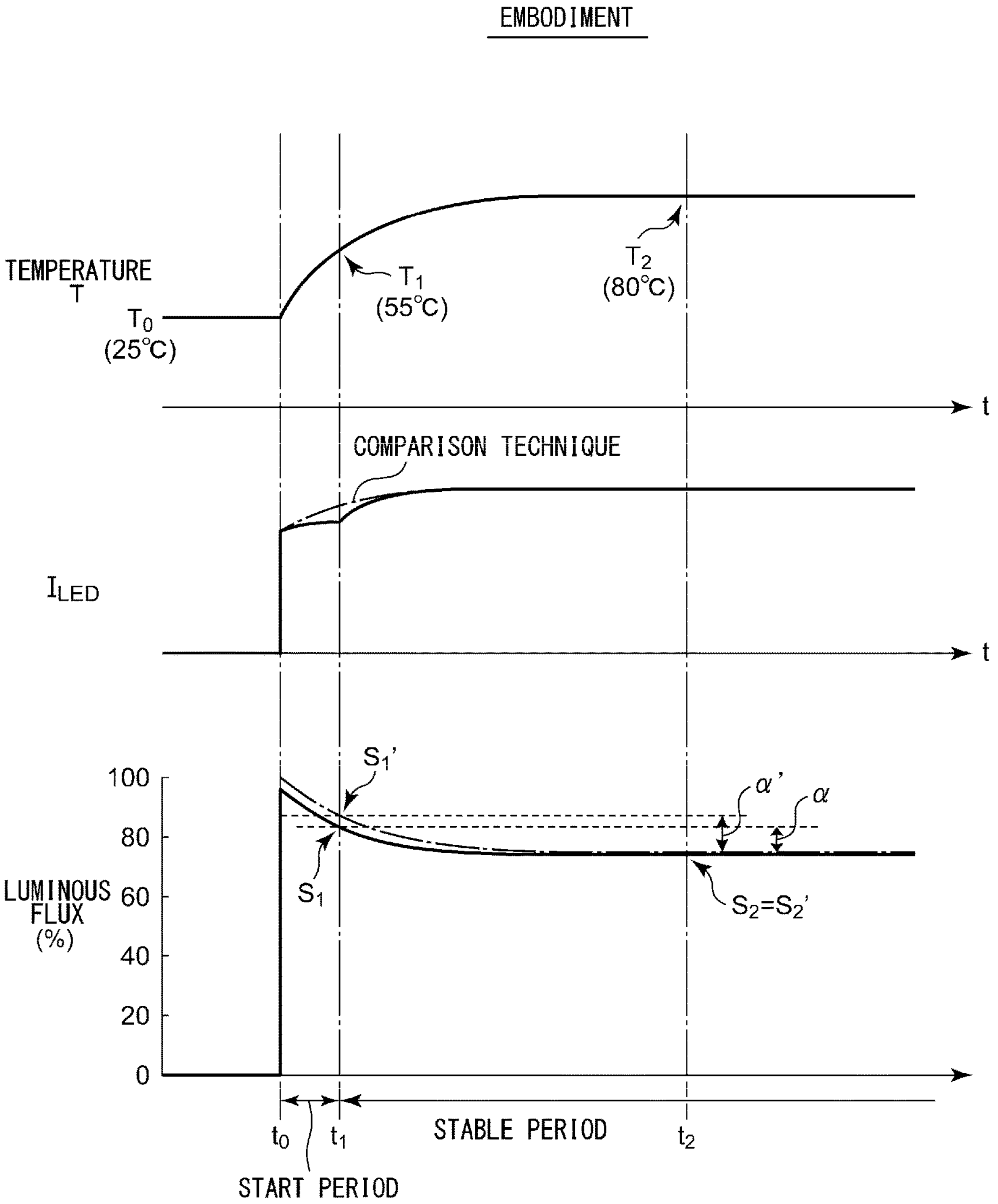
FIG. 7 is an operation waveform diagram of an automotive lamp according to an example.

Next, description will be made regarding the operation of the automotive lamp 300 according to an embodiment. FIG. 7 is an operation waveform diagram of the automotive lamp 300 according to the embodiment. In addition, the waveforms in the comparison technique are also shown by the lines of alternately long and short dashes.

Description will be made assuming that the temperature T of the semiconductor light source transits in the same manner as shown in FIG. 6. With the embodiment, the correction rate (amount of increase) of the driving current $I_{LED}$ in a start period that corresponds to the first temperature range $T_0$ to $T_1$ is smaller than that in the comparison technique (indicated by the line of alternately long and short dashes). Accordingly, with the embodiment, the rate of decrease in the luminous flux in the start period is larger as compared with that in the comparison technique.

The correction rate (correction amount) of the driving current $I_{LED}$ is increased in a stable period that corresponds to the second temperature range $T_1$ to $T_2$ as compared with the comparison technique. Eventually, the luminous flux decreases to the same level as in the comparison technique.

That is to say, the lighting circuit 400 is configured such that the amount of change of the driving current $I_{LED}$ in the start period immediately after the automotive lamp 300 is turned on is smaller than that of the driving current $I_{LED}$ in the stable period.

Description will be made regarding a comparison between the lumen maintenance rate according to the embodiment and that according to the comparison technique. Description will be made assuming that, at the time point $t_2$ after a sufficient period of time elapses after turning on, the same luminous flux $S_2$ is provided regardless of the embodiment or the comparison technique. Also, description will be made with the luminous flux provided by the embodiment at the start point $t_1$ in the stable period as $S_1$, and with that provided by the comparison technique as $S_1'$. The lumen maintenance rate α provided by the embodiment is represented by $S_2/S_1\times 100$(%). In contrast, the lumen maintenance rate α' provided by the comparison technique is represented by $S_2/S_1'\times 100$ (%). Here, the relation $S_1<S_1'$ holds true. Accordingly, $\alpha>\alpha'$ holds true. That is to say, with the embodiment, such an arrangement provides a higher lumen maintenance rate than that provided by the comparison technique.

The above is the operation of the automotive lamp 300. With the automotive lamp 300, this is capable of providing an amount of light with improved stability while ensuring the reliability of the semiconductor light source 302. In particular, the luminance of red LEDs has significant temperature dependence as compared with other kinds of elements. Accordingly, by applying the present invention to a stop lamp or a tail lamp, this provides improved commercial value.

The present disclosure encompasses various kinds of apparatuses and methods that can be regarded as a block configuration or a circuit configuration shown in FIG. 3, or otherwise that can be derived from the aforementioned description. That is to say, the present invention is not restricted to a specific configuration. More specific description will be made below regarding example configurations or examples for clarification and ease of understanding of the essence of the present invention and the operation thereof. That is to say, the following description will by no means be intended to restrict the technical scope of the present invention.

EXAMPLE

Figure 8:
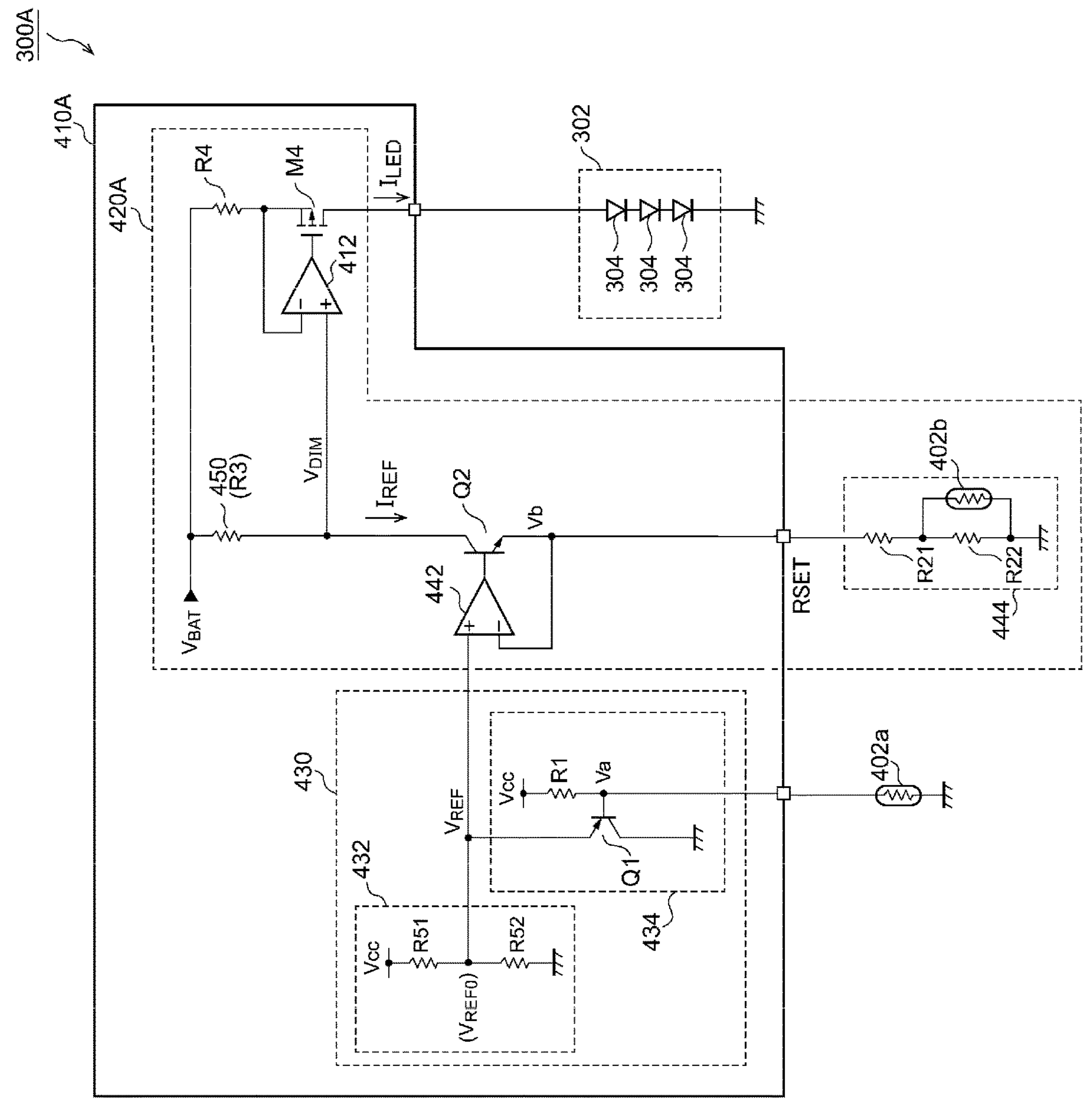
FIG. 8 is a block diagram showing an automotive lamp according to an example.

FIG. 8 is a block diagram showing an automotive lamp 300A according to an example. A constant current driver 410A includes a current source 420A and a reference voltage generating circuit 430. Main components of a lighting circuit 400A are integrated on a single semiconductor chip.

The reference voltage generating circuit 430 generates a reference voltage $V_{REF}$ that is maintained at a constant value in a normal range, and that decreases according to an increase of the temperature T in a high-temperature range that is higher than the third temperature $T_3$.

The lighting circuit 400A is provided with a current-setting terminal (current-setting pin) RSET. The current-setting terminal RSET is configured such that it can be coupled to an external circuit component. The current source 420A generates a driving circuit $I_{LED}$ that is proportional to the reference voltage $V_{REF}$, and is inversely proportional to the impedance (resistance value) $R_{SET}$ of a temperature-detection circuit 444 coupled to the current-setting terminal.

$$I_{LED} \propto V_{REF}/R_{SET}$$

For example, the temperature-detection circuit 444 may include a first resistor R21 and a second resistor R22 arranged in series between the current-setting terminal RSET and the ground, and a second thermistor 402*b* configured as a negative temperature coefficient (NTC) thermistor arranged in parallel with the second resistor R22.

An operational amplifier 442, a second transistor Q2, and the temperature-detection circuit 444 form a V/I conversion circuit. The output current $I_{REF}$ thereof is represented by $I_{REF}=V_{REF}/R_{SET}$. An I/V conversion circuit 450 converts the reference current $I_{REF}$ into a dimming voltage $V_D$IM.

The reference voltage generating circuit 430 includes a voltage dividing circuit 432 and a clamp circuit 434. The voltage dividing circuit 432 divides a power supply voltage $V_{CC}$ so as to generate the reference voltage $V_{REF}$. The clamp circuit 434 clamps the reference voltage $V_{REF}$ such that it is equal to or lower than an upper limit voltage that corresponds to the temperature T. In a case in which the clamp circuit 434 is ignored, the reference voltage $V_{REF0}$ is represented by the following Expression.

$$V_{REF0}=V_{CC}\times R51/(R51+R52)$$

The clamp circuit 434 includes a first transistor Q1, a first resistor R1, and a first thermistor 402*a*. The first transistor Q1 is configured as a PNP bipolar transistor, and is arranged between an output node of the voltage dividing circuit 432 and the ground. The first resistor R1 and the temperature-sensing element 402 form a second temperature detection unit. The second temperature detection unit generates a first detection signal Va that changes significantly according to the temperature of the semiconductor light source 302 in a high-temperature range, so as to bias a control terminal (base) of the first transistor Q1 according to the temperature. As the first transistor Q1, a P-channel MOSFET may be employed. Alternatively, instead of the first transistor Q1, a diode may be provided such that its anode receives the reference voltage $V_{REF}$, and its cathode receives the first detection signal Va.

The first thermistor 402*a* mainly determines the slope of the driving current $I_{LED}$ in the high-temperature range. The resistance value Ra of the first thermistor 402*a* has a Negative Temperature Coefficient (NTC). With the voltage at a connection node that connects the first resistor R1 and the first thermistor 402*a* as Na, the reference voltage $V_{REF}$ is clamped with (Va+Vf) as its upper limit.

When the temperature $T_1$ is within the normal range ($T<T_3$), the relation $Va+Vf>V_{REF0}$ holds true. Accordingly, $V_{REF}=V_{REF0}$ holds true. In this case, the reference voltage $V_{REF}$ is a constant value that is independent of the temperature.

When the temperature T exceeds the third temperature $T_3$ and enters the high-temperature range, the clamp is enabled. In this state, $V_{REF}=Va+Vf$ holds true. That is to say, as the temperature increases, Va decreases, leading to a reduction of the reference voltage $V_{REF}$.

The I/V conversion circuit 450 includes a third resistor R3. The third resistor R3 is provided on a path of the reference current $I_{REF}$. The dimming voltage $V_{DIM}$ occurs according to the voltage drop across the third resistor R3.

$$V_{DIM}=V_{BAT}-R3\times I_{REF}$$

The current source 420A is configured as a current-source circuit including a resistor R4, a transistor M4, and an operational amplifier 412. The current source 420A generates a driving current $I_{LED}$ that is proportional to the dimming voltage $V_{DIM}$.

$$I_{LED}=I_{REF}\times R3/R4$$

Figure 9:
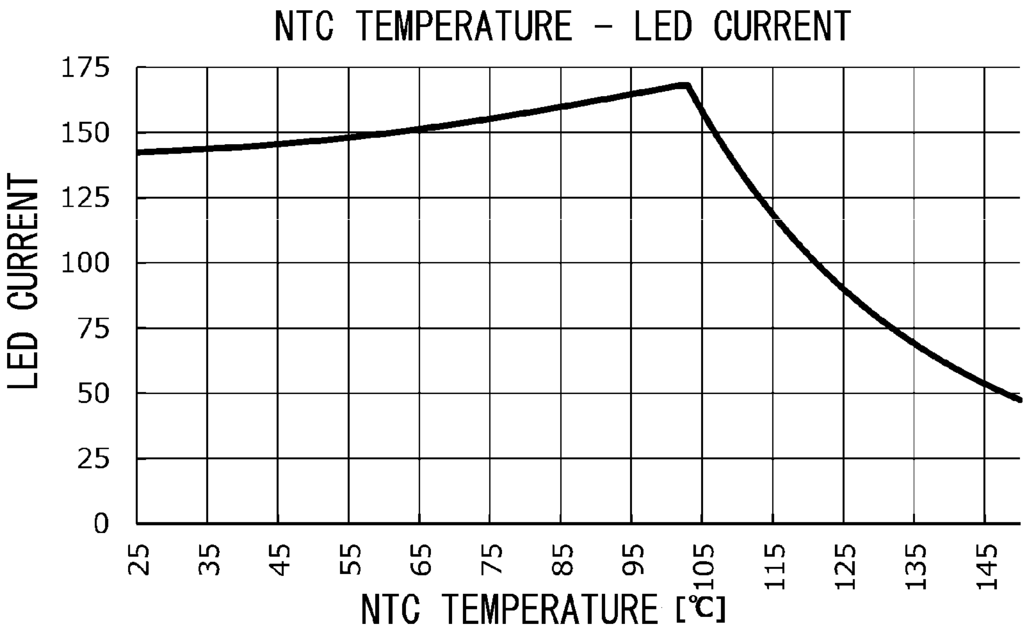
FIG. 9 is a diagram showing the temperature characteristics of the driving current $I_{LED}$ in a constant current driver shown in FIG. 8.

FIG. 9 is a diagram showing the temperature characteristics of the driving current $I_{LED}$ to be supplied by the constant current driver 410A shown in FIG. 8. The temperature characteristics are designed with $T_0$=25° C., $T_1$=50° C., and $T_2$=80° C. The temperature characteristics are designed such that the slope in the temperature range from 50 to 80° C. is larger than that in the temperature range from 25 to 50° C.

With the embodiment, this provides the luminous flux of the semiconductor light source with both stability and reliability.

Figure 10A:
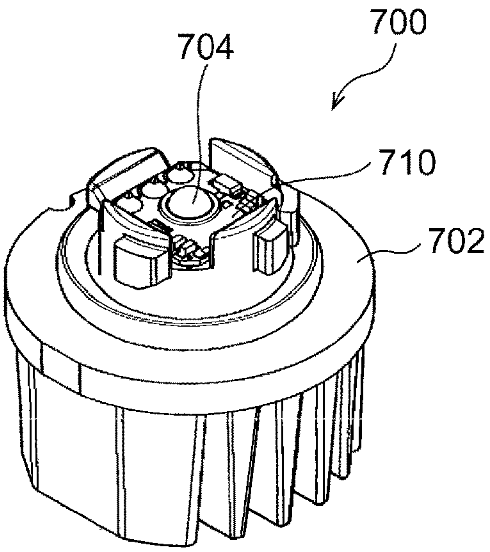
FIGS. 10A through 10D are diagrams showing an LED socket that is an example of the automotive lamp.
Figure 10B:
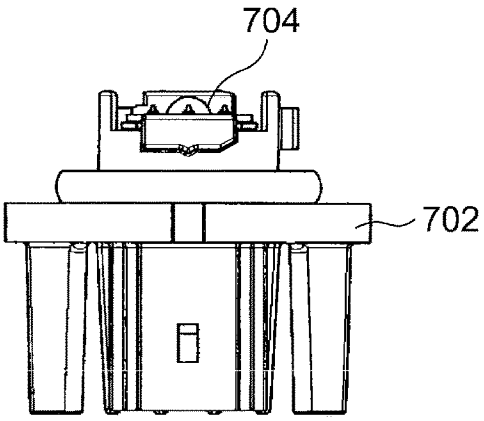
Figure 10C:
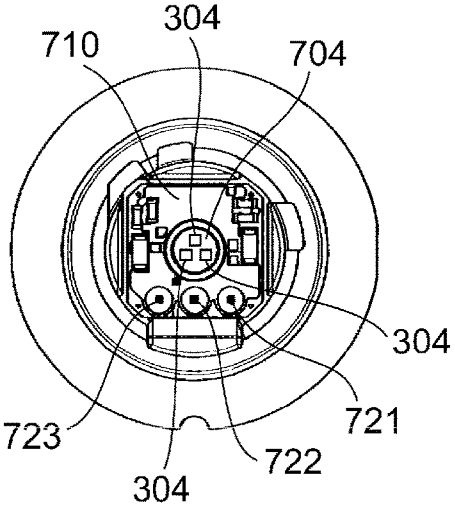
Figure 10D:
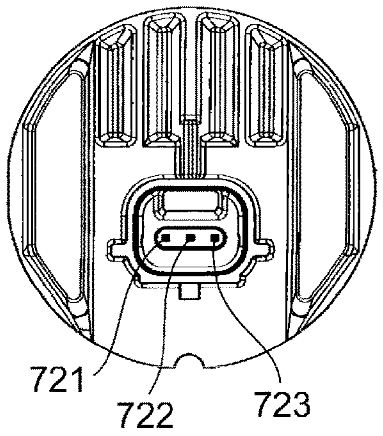

FIGS. 10A through 10D are diagrams each showing an LED socket 700 that is an example of the automotive lamp 300. FIG. 10A is an external perspective view of an LED socket 700. FIG. 10B is a front view of the LED socket 700. FIG. 10C is a plan view of the LED socket 700. FIG. 10D is a bottom view of the LED socket 700.

A housing 702 has a structure that allows it to be detachably mounted on an unshown lamp body. Multiple light-emitting elements 304 that form the semiconductor light source 302 are mounted in a central portion of the housing 702, which are covered by a transparent cover 704. Components of the lighting circuit 600 are mounted on a substrate 710. The multiple light-emitting elements 304 are configured as a red LED chip, which is employed as a stop lamp or a rear fog lamp.

An LED socket configured to function as both a stop lamp and a tail lamp has a structure in which a light-emitting element to be used for the tail lamp is mounted at a central portion among the multiple light-emitting elements 304. Furthermore, a lighting circuit for the tail lamp is mounted on the substrate 710.

Three pins 721, 722, and 723 are exposed on the bottom face side of the housing 702. A first input voltage $V_{IN1}$ is supplied to the pin 723 via a switch. The ground voltage is supplied to the pin 721. The pin 722 receives the supply of a second input voltage $V_{IN2}$ that is set to a high level when the tail lamp is turned on. The pins 721 through 723 are arranged such that they pass through the interior of the housing 702. One end of each pin is coupled to a wiring pattern of the substrate 710.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

Modification 1

Figure 11A:
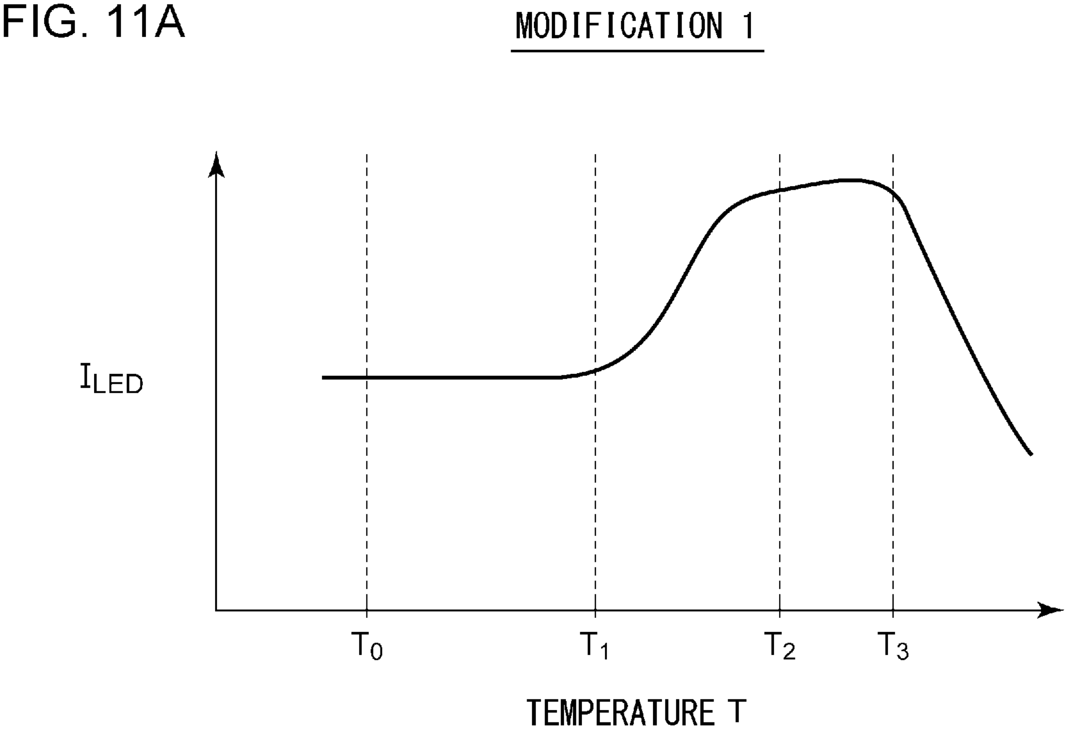
FIGS. 11A and 11B are diagrams showing the temperature characteristics of the driving current $I_{LED}$ according to modifications 1 and 2.

The temperature characteristics of the driving current $I_{LED}$ are not restricted to the example shown in FIG. 4. FIG. 11A is a diagram showing the temperature characteristics of the driving current $I_{LED}$ according to a modification 1. In the modification 1, the driving current LED is flat, or has a very small slope, in the first temperature range $T_0$ through $T_1$.

Modification 2

Figure 11B:
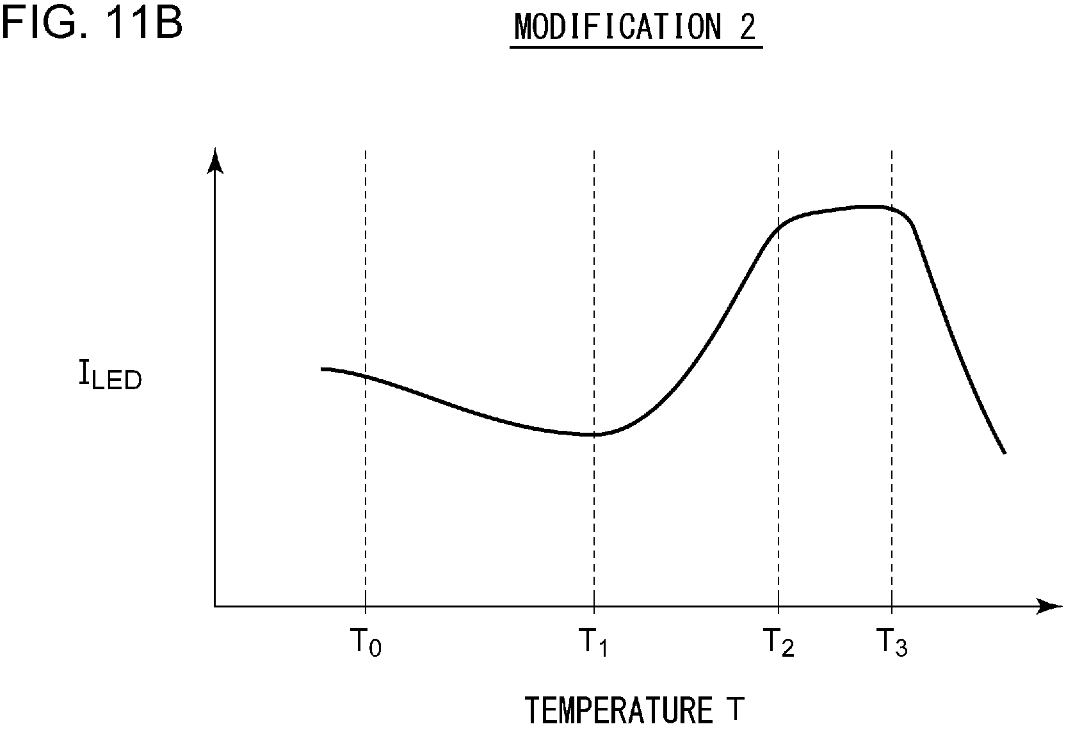

FIG. 11B is a diagram showing the temperature characteristics of the driving current $I_{LED}$ according to a modification 2. In the modification 2, in the first temperature range $T_0$ through $T_1$, the driving current $I_{LED}$ decreases according to an increase of the temperature. Accordingly, the differential of the driving current $I_{LED}$ may have a negative value. This arrangement allows the luminous flux to be further reduced at the start time point of the stable period when the temperature reaches $T_1$, thereby providing an improved lumen maintenance rate in the stable period.

Modification 3

Figure 12:
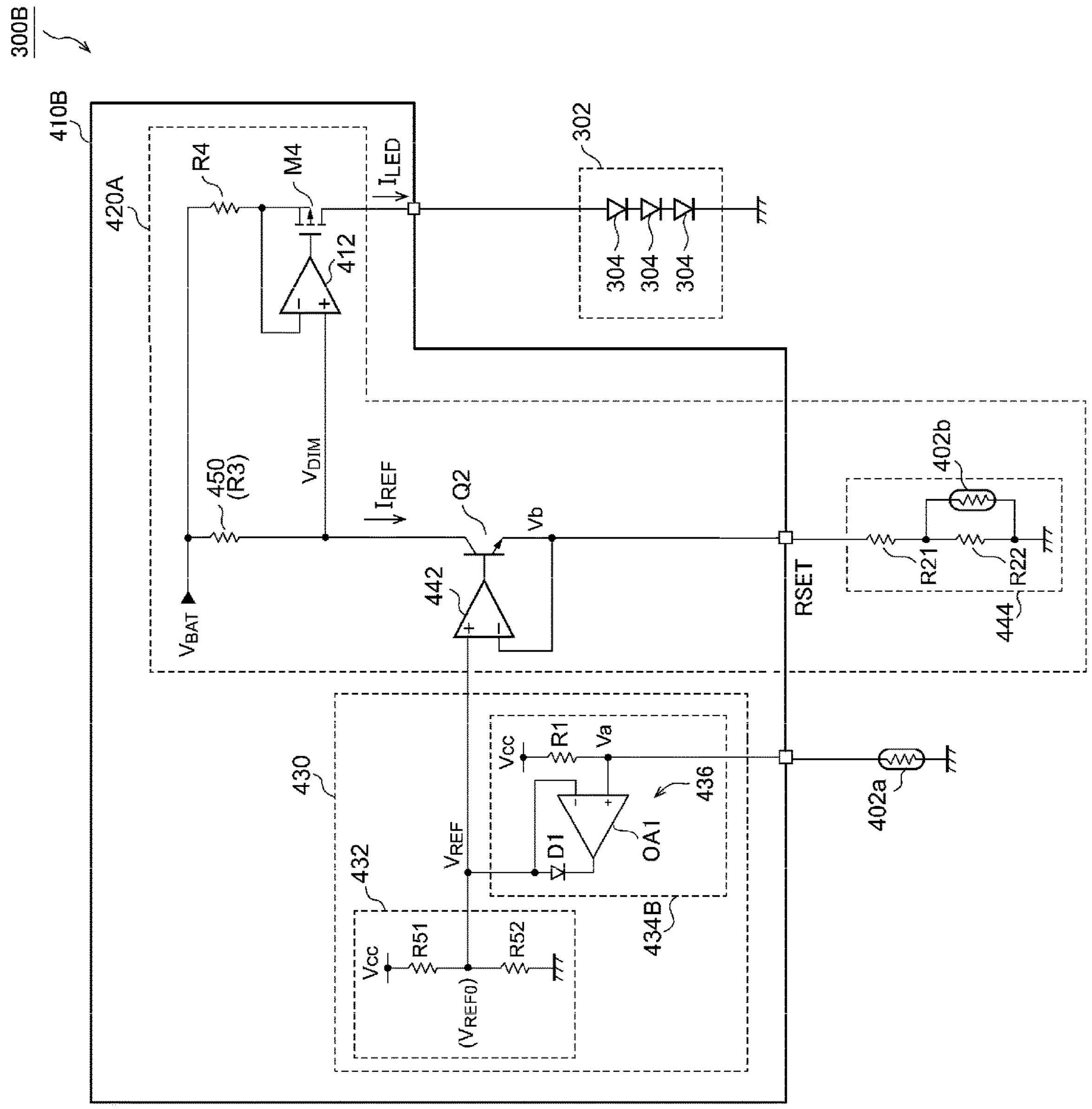
FIG. 12 is a circuit diagram of a constant current driver according to a modification 3.

FIG. 12 is a circuit diagram showing a constant current driver 410B according to a modification 3. Instead of the first transistor Q1 shown in FIG. 8, a clamp circuit 434B includes a current-sink-type buffer 436 including an operational amplifier OA1 and a diode D1. The buffer 436 clamps the voltage $V_{REF}$ at the output node of the voltage dividing circuit 432 such that it does not exceed Va. With the configuration shown in FIG. 8, the clamp level is affected by variation of the base-emitter voltage Vf of the bipolar transistor Q1. In contrast, with such an arrangement shown in FIG. 12, the clamp level is not affected by the forward voltage Vf of the diode D1, thereby providing improved accuracy.

Modification 4

The configuration of the constant current driver 410 is not restricted to such arrangements described in the example. Also, other known circuit configurations may be employed. For example, the constant current driver 410 may be configured as a constant-current-output switching converter. Also, the switching converter may be configured as a step-down switching converter, a step-up switching converter, or a step-up/step-down switching converter. The type of the switching converter may preferably be selected according to the number of diodes included in the semiconductor light source 302.

Modification 5

Description has been made in the embodiment regarding an arrangement in which, as a temperature-sensing element, an NTC thermistor having a negative temperature coefficient is employed. However, the present invention is not restricted to such an arrangement. Also, a PTC thermistor (posistor) may be employed. Alternatively, as such a temperature-sensing element, a diode temperature sensor may be employed that makes use of the temperature dependence of the voltage across both ends thereof when a constant current is applied to a PN junction (i.e., diode).

Modification 6

Description has been made in the example in which the temperature characteristics of the driving current are designed by means of an analog circuit. However, the present invention is not restricted to such an arrangement. For example, the output of the temperature-sensing element may be converted into a digital value so as to create the temperature characteristics of the driving current $I_{LED}$ by digital control.

Modification 7

Description has been made in the embodiment regarding an arrangement in which the driving current $I_{LED}$ is varied by analog dimming (linear dimming) based on the dimming voltage $V_{DIM}$. However, the present invention is not restricted to such an arrangement. Also, PWM dimming may be employed. In this case, a dimming pulse may be generated with a duty ratio that corresponds to the dimming voltage $V_D$IM. Also, a constant current stabilized to a constant amount may be switched on and off according to the dimming pulse thus generated, so as to generate the driving current $I_{LED}$.

Modification 8

A combination of analog dimming and PWM diming may be employed. For example, the temperature derating may be provided by analog dimming in the high-temperature range. Also, the luminance may be stabilized by PWM dimming in the normal range, or vice versa.

Modification 9

The decrease of luminous flux according to an increase in the temperature is particularly marked in red LEDs. However, in some cases, LEDs of other colors or laser diodes (LDs) have similar features. Accordingly, the present disclosure can be effectively applied to automotive lamps provided with various kinds of semiconductor light sources.

What is claimed is:

1. A lighting circuit comprising:

a temperature-sensing element having an electrical state that changes according to a temperature T of a semiconductor light source; and a constant current driver structured to generate a driving current that corresponds to the temperature T, wherein a maximum value of a temperature differential of the driving current in a first temperature range from a reference temperature $T_0$ to a first temperature $T_1$ ($T_1>T_0$) is smaller than a maximum value of a temperature differential of the driving current in a second temperature range from the first temperature $T_1$ to a second temperature $T_2$ ($T_2>T_1$), wherein the constant current driver comprises:

a current source having a current-setting terminal, and structured to generate the driving current that is inversely proportional to an impedance of a circuit coupled to the current-setting terminal;

a first resistor and a second resistor arranged in series between the current-setting terminal and a ground; and a Negative Temperature Coefficient (NTC) thermistor arranged in parallel with the second resistor.

2. The lighting circuit according to claim 1, wherein the first temperature $T_1$ is determined based on a temperature at a start time point of a stable period, and wherein the second temperature $T_2$ is determined based on a steady temperature in the stable period.

3. The lighting circuit according to claim 1, wherein both the temperature differential of the driving current in the first temperature range $T_0$ to $T_1$ and the temperature differential of the driving current in the second temperature range $T_1$ to $T_2$ are a positive value.

4. The lighting circuit according to claim 1, wherein the temperature differential of the driving current in the first temperature range $T_0$ to $T_1$ is a negative value, and the temperature differential of the driving current in the second temperature range $T_1$ to $T_2$ is a positive value.

5. The lighting circuit according to claim 1, wherein, in a third range that is higher than a third temperature $T_3$ ($T_3>T_2$), the driving current decreases.

6. An automotive lamp comprising:

the semiconductor light source; and the lighting circuit according to claim 1, structured to drive the semiconductor light source.

7. The lighting circuit according to claim 1, further comprising a reference voltage generating circuit structured to generate a reference voltage, wherein the reference voltage generating circuit includes:

a voltage dividing circuit structured to divide a power supply voltage;

a first transistor having a first end coupled to the output of the voltage dividing circuit, having a second end grounded and a control electrode;

a third resistor having a first end received with the power supply voltage and having a second end coupled to the control electrode of the first transistor; and a second thermistor having Negative Temperature Coefficient, coupled between the control electrode of the first transistor and ground, and wherein the current source includes:

an output terminal;

a second transistor having a first end coupled to the current-setting terminal, a second end and a control electrode;

a second operational amplifier having a first input supplied with the reference voltage, having a second input coupled to the current-setting terminal, and an output coupled to the control electrode of the second transistor, a fourth resistor coupled between a battery line and the second end of the second transistor;

a third transistor having a first end coupled to the output terminal, a second end and a control electrode;

a fifth resistor coupled between the second end of the third transistor and the battery line; and a second operational amplifier having a first input coupled to the second end of the third transistor, having a second input coupled to the second end of the second transistor, and having an output coupled to the control electrode of the third transistor.

* * * * *